United States Patent [19]

Nelson

[11] Patent Number: 4,518,045
[45] Date of Patent: May 21, 1985

[54] VEHICLE WITH COOLANT PRESSURE RESPONSIVE HITCH CONTROL

[75] Inventor: Roger J. Nelson, Cedar Falls, Iowa

[73] Assignee: Deere & Company, Moline, Ill.

[21] Appl. No.: 504,002

[22] Filed: Jun. 13, 1983

[51] Int. Cl.³ .............................................. A01B 63/112
[52] U.S. Cl. ..................................... 172/7; 123/41.13; 172/3
[58] Field of Search ......................... 172/2, 3, 7, 9, 10, 172/11, 12; 123/41.13, 41.15

[56] References Cited

U.S. PATENT DOCUMENTS

| | | | |
|---|---|---|---|
| 4,023,622 | 5/1977 | Gregerson | 172/9 |
| 4,344,499 | 8/1982 | van der Lely et al. | 172/3 X |
| 4,438,818 | 3/1984 | Treichel et al. | 172/9 |
| 4,450,801 | 5/1984 | Thedens et al. | 123/41.15 X |
| 4,454,919 | 6/1984 | Arnold et al. | 172/3 X |

FOREIGN PATENT DOCUMENTS 2623097 12/1977 Fed. Rep. of Germany .......... 172/9

Primary Examiner—Richard T. Stouffer

[57] ABSTRACT

An engine driven agricultural tractor has a hitch control system with an actuator which is responsive to a differential coolant pressure across the engine driven coolant pump.

10 Claims, 2 Drawing Figures

VEHICLE WITH COOLANT PRESSURE RESPONSIVE HITCH CONTROL

BACKGROUND OF THE INVENTION

The present invention relates to a hitch control system for an agricultural vehicle.

It is known that hitch control systems which are responsive only to sensed draft force will not maintain a constant load on the engine. In fact, under certain conditions, such systems can even cause engine stalling. Therefore, it has been believed that tractor productivity and performance could be improved if the hitch is raised during overload conditions such as when the engine speed is lowered or "drooping". This concept is illustrated in U.S. Pat. No. 4,077,475 to Hino et al, issued Mar. 7, 1978. A more sophisticated hitch control system utilizing an engine speed input is described in U.S. patent application, Ser. No. 360,748, filed Mar. 22, 1982 and assigned to the assignee of this invention. Another hitch control system which is responsive to engine speed is described in copending U.S. patent application, Ser. No. 501,690, filed June 6, 1983 and also assigned to the assignee of this invention. All of these engine speed responsive systems require expensive and complicated electronic components and circuits and cannot easily be added to current production hitch systems.

SUMMARY OF THE INVENTION

An object of the present invention is to provide a hitch control system which responds to changes in vehicle engine speed.

Another object of the present invention is to provide an engine speed responsive hitch control system which can easily be added to current production hitch systems.

These and other objects are achieved by the present invention which is adapted for use with a conventional hitch control system which has a valve control shaft which rotates to control a conventional hitch control valve. According to the present invention, the valve control shaft pivotally carries a hand-operated rockshaft control lever. A short lever is fixed to the valve control shaft and carries a pivot pin spaced apart from the axis of the valve control shaft. A link is pivoted on the control lever and has a recess which receives the pivot pin. An actuator is responsive to a pressure differential across the engine driven water pump and is coupled to the link so that reduced engine speed causes the actuator to pivot the link and rotate the valve control shaft so that the hitch control valve raises the hitch without movement of the rockshaft control lever.

DETAILED DESCRIPTION

Figure 1:
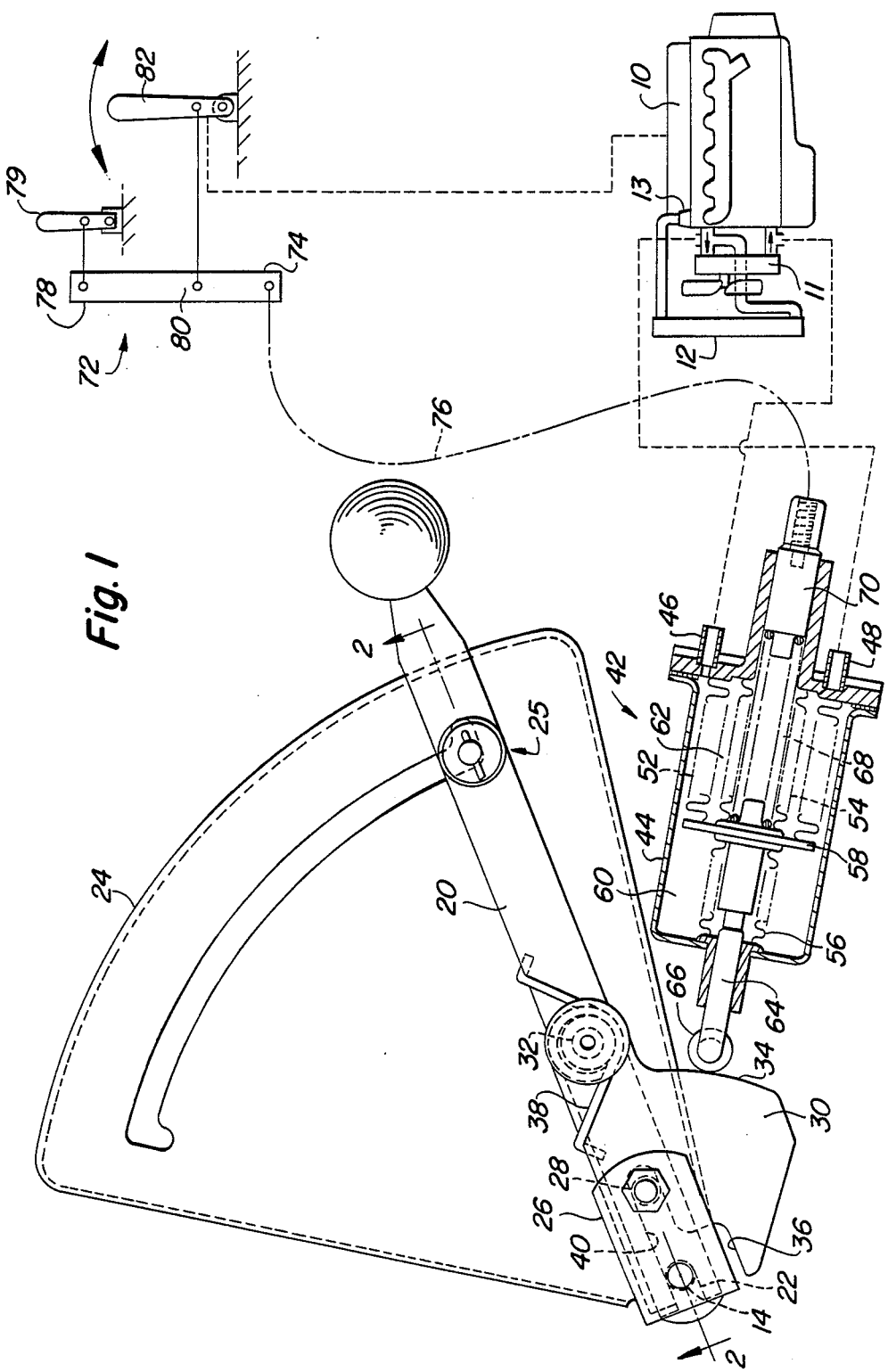
FIG. 1 is a partially schematic and sectional view of components of the present invention.
Figure 2:
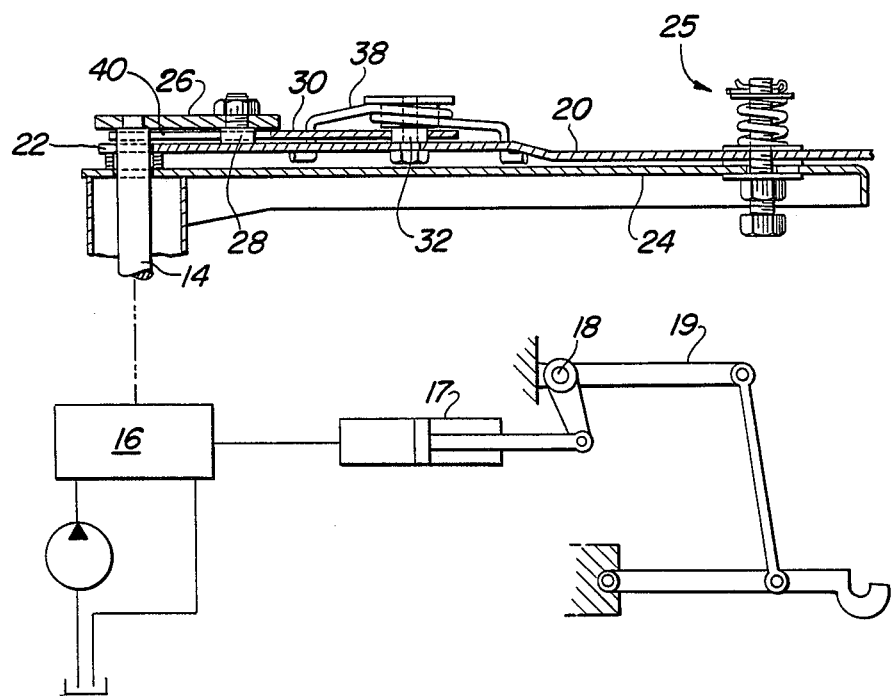
FIG. 2 is a partial schematic and sectional view of components of the present invention, including a section along lines 2—2 of FIG. 1.

A conventional agricultural vehicle includes an engine 10, a water pump 11, a radiator 12 and a thermostat valve 13. Such a vehicle may also include a conventional hitch control system such as described in U.S. Pat. No. 3,455,397, issued July 15, 1969 to this inventor and assigned to the assignee of the present invention. Such a control system includes a shaft 14 operatively coupled via a linkage to a conventional rockshaft control valve 16 which controls fluid flow to a conventional rockshaft cyliner 17, as shown in FIG. 2. In such a system, it can be assumed that a counterclockwise rotation of shaft 14 (viewing FIG. 1) will cause a counterclockwise rotation of rockshaft 18 and a lifting of lift arms 19.

A rockshaft control lever 20 has an end with a slot 22 which pivotally receives a portion of shaft 14. The lever 20 rotates about the axis of shaft 14 and with respect to a quadrant housing 24. Preferably, lever 20 is also coupled to the housing 24 via a conventional friction coupling 25 so that lever 20 will be fixed with respect to quadrent 24 unless it is moved by the operator.

A short lever 26 is welded to an end of the shaft 14 and carries a pivot pin 28 spaced radially away from shaft 14. A link 30 is pivotally coupled to rockshaft control lever 20 by a pivot pin 32. The link 30 includes an arcuate bearing surface 34 and a recess 36 which receives the pivot pin 28 and the shaft 14. A torsion spring 38 biases the link 30 so that the wall 40 of recess 36 normally engages the shaft 14.

An actuator 42 includes a housing 44 with a pair of ports 46 and 48. Port 46 is communicated with the outlet of the water pump 11. Port 48 is communicated with the inlet of water pump 11. The actuator 42 includes a set of three metal collapsible bellows 52, 54 and 56 which are connected between the housing 44 and a piston 58. The bellows define an outlet pressure chamber 60 and an inlet pressure chamber 62. They also keep coolant away from the piston 58.

The piston 58 has a rod 64 which extends outwardly from the housing 44 and which carries a roller 66 for engaging the bearing surface 34 of link 30. A spring 68 urges the piston 58 towards the link 30. A spring stop 70 is adjustable in the end of housing 44 to control the bias of spring 68.

It may be desirable to be able to manually de-activate the actuator 42. This can be accomplished by means of the differential link 72. An end 74 of link 72 is coupled by a push-pull cable 76 to the spring stop 70. The other end 78 of link 72 is coupled via a suitable linkage to a manual control lever 79, so as to effectuate left and right movement of end 78 of link 72. A third point 80, between ends 74 and 78, is coupled by a suitable linkage to the conventional engine throttle control 82.

This structure could be used with or without a conventional draft control system with mechanical draft force sensing (such as described in U.S. Pat. No. 3,455,397) or with hydraulic draft force sensing (such as used in production tractors such as the Deere models 8440 or 8640). In this case, the shaft 14 would constitute a portion of the shaft which links the rockshaft control lever to the cam adjusting link which is connected to the valve adjusting cam.

MODE OF OPERATION

The differential pressure across the water pump 11 bears a useful relationship to the speed of the engine 10. Thus, when the engine speed droops (as when the load on the engine is increased) the differential pressure across the water pump 11 decreases. This decreases the differential pressure between chambers 60 and 62 which acts on piston 58 and permits spring 68 to move piston 58 and roller 66 to the left viewing FIG. 1. Since lever 20 is frictionally held in place with respect to quadrant 24, link 30 is forced to pivot clockwise about pivot 32.

The engagement of link 30 with pin 28 causes short lever 26 and shaft 14 to rotate counterclockwise. This counterclockwise rotation of shaft 14 causes the rockshaft 18 to pivot and lift the lift arms 19, thus decreasing the draft force produced load on the engine 10.

Moving the throttle 82 to increase the engine speed causes cable linkage 76 to move spring stop 70 to the left and increase the spring force against piston 58. This also produces a counterclockwise rotation of shaft 14 and a raising of the lift arms 19. In this manner, the engine speed is compared to the throttle setting and is used to adjust the rockshaft position when the engine speed is too low.

The actuator 42 can be manually de-activated by pivoting end 78 of lever 72 to the left so that lever 72 pivots counterclockwise about 80. This pulls spring stop 70 to the right and reduces the bias of spring 68. This prevents a reduction in the differential pressure between chambers 60 and 62 from causing piston 58 to pivot link 30 clockwise.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In a vehicle having a hitch and an engine-driven coolant pump, a hitch control system for raising and lowering the hitch, comprising:

actuator means for moving in response to a coolant pressure from the coolant pump; and control means operatively coupled to the actuator means for raising and lowering the hitch in response to movement of the actuator means, the control means comprising hydraulic means for raising and lowering the hitch, including a hitch control valve operated by a rotatable input shaft, a first lever pivotal about the input shaft and carrying a first pivot spaced apart from an axis of the input shaft, a second lever fixed for rotation with the input shaft and carrying a second pivot spaced apart from an axis of the input shaft, and a cam link pivotal about the first pivot, having a recess with walls which engage the second pivot, an abutment engageable with the input shaft and a cam surface engaging the actuator means, the cam link pivoting about the first pivot in response to movement of the actuator means to pivot the second lever and rotate the input shaft to cause the hydraulic means to raise and lower the hitch.

2. The invention of claim 1, wherein the actuator means comprises:

a cylinder having a piston movable therein and connected to a rod which engages the cam surface of the cam link, the cylinder having a first chamber communicated with an outlet of the coolant pump, and a second chamber communicated with an inlet of the coolant pump, the piston and rod moving to pivot the cam link in response to changes in a differential pressure between the first and second chambers.

3. The invention of claim 2, wherein the actuator means further comprises:

a resilient member biassed to urge the piston and rod towards the cam surface; and a stop member coupled to the resilient member and movable to adjust the bias thereof.

4. The invention of claim 3, further comprising:

a pivotal control link having a first end linked to the stop member, a second end linked to a manually operated control lever, and a central portion linked to a throttle control lever of the engine, the control link moving the stop member to adjust the bias of the resilient member in response to movement of the control levers.

5. The invention of claim 2, wherein the actuator means further comprises:

a housing slidably receiving the rod and having a first part communicated with the coolant pump outlet and a second part communicated with the coolant pump inlet; and first, second and third bellows coupled between the piston and the housing, the housing and the first and second bellows enclosing the first chamber, the housing and the second and third bellows enclosing the second chamber, the third bellows being mounted coaxially within the second bellows.

6. The invention of claim 1, further comprising:

friction means coupled to the first lever for preventing pivoting of the first lever when the actuator means moves to pivot the cam link and second lever.

7. The invention of claim 1, further comprising:

a torsion spring coupled between the first lever and the cam link and biassed to urge the abutment into engagement with the input shaft.

8. The invention of claim 7, wherein the torsion spring has a coil surrounding a portion of the first pivot.

9. In a vehicle having a hitch and an engine-driven coolant pump, a hitch control system for raising and lowering the hitch, comprising:

actuator means for moving in response to a coolant pressure from the coolant pump; and control means operatively coupled to the actuator means for raising and lowering the hitch in response to movement of the actuator means, the actuator means comprising a cylinder having a piston movable therein and connected to a rod which engages the control means, the cylinder having a first chamber communicated with an outlet of the coolant pump and a second chamber communicated with an inlet of the coolant pump, the piston and rod moving to operate the control means in response to a differential pressure between the first and second chambers.

10. The invention of claim 9, further comprising:

a pivotal control link having a first end linked to the actuator means, a second end linked to a manually operated control lever, and a central portion linked to a throttle control lever of the engine, the control link moving the actuator means in response to movement of the control levers.

* * * * *